Nov. 9, 1965   L. W. SLOAN   3,216,718
WORK HOLDING AND FEEDING DEVICE FOR TABLE SAWS
Filed June 10, 1963
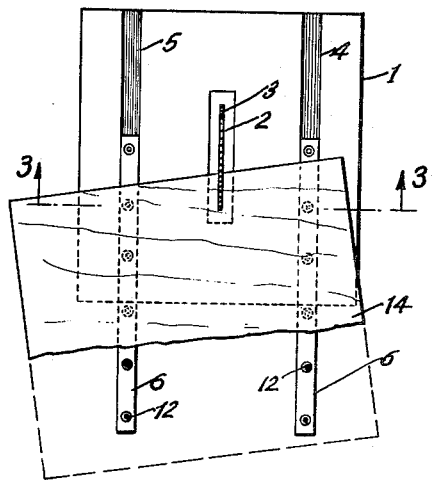
Fig.1.
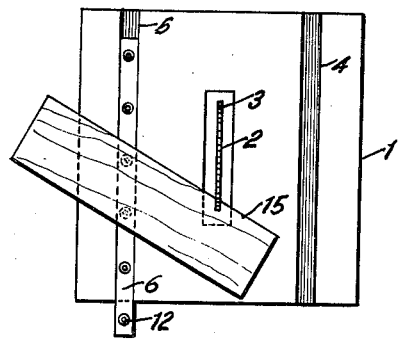
Fig.2.
Fig.3.
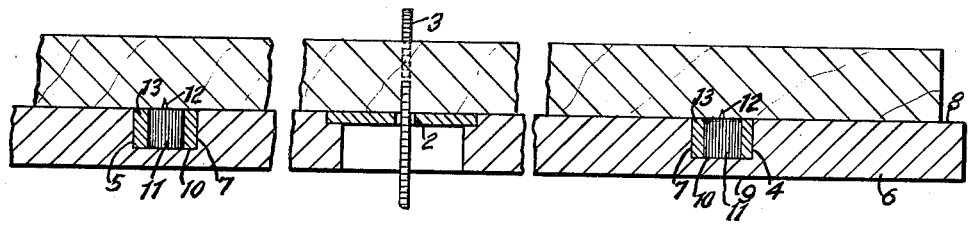
Fig.4.
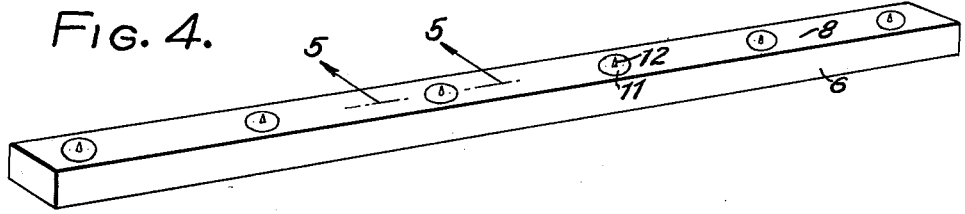
Fig.6.
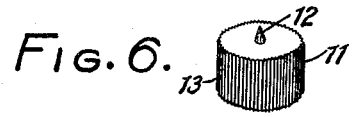
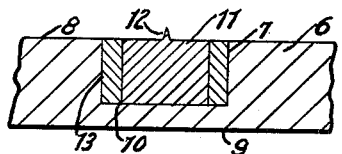
Fig.5.
INVENTOR,
LAURENCE W. SLOAN;
BY
*Calvin Brown*
ATTORNEY

United States Patent Office 3,216,718
Patented Nov. 9, 1965

3,216,718
WORK HOLDING AND FEEDING DEVICE FOR TABLE SAWS
Laurence W. Sloan, 1905 W. Merle Drive, Montebello, Calif.
Filed June 10, 1963, Ser. No. 286,593
2 Claims. (Cl. 269—53)

The present invention relates to a work holding and feeding device for table saws, wherein the work is positioned at any specified angle relative to the circular saw, to be cut by said saw, as the work is fed thereto.

An object of my invention is the provision of simple inexpensive means for quickly and positively securing work in a desired position for cutting by a rotary saw.

Another object is the provision of a device for holding work which allows accurate cutting of the work by a rotary saw and which device is simple, durable, economical of construction and adaptable to any rotary saw table and which allows the work to be quickly and conveniently adjusted to produce cuts at any desired angle relative to the saw.

At the present time it is customary in the industry to supply what are termed table mounted rotary power saws and the table top is ordinarily provided with a pair of parallel grooves on opposite sides of the saw. Such grooves are adapted to receive bars which are freely movable within the grooves. It is ordinary practice to provide the bar or bars with some form of miter gauge whereby the work may be held against the miter gauge at a selected angle, to be cut by the saw blade. With my invention I do not require the use of a miter gauge as my invention incorporates bars within the grooves formed to maintain the work at a desired angularity relative to the saw.

With the above mentioned and other objects in view, as will hereinafter appear, the invention consists in the novel and useful provision, formation, construction, association and relative arrangement of parts, members and features, all as shown in one embodiment in the accompanying drawing, described generally, and more particularly pointed out in the claims.

In the drawing:

FIGURE 1 is a fragmentary, plan view of a table mounted rotary power saw, the table incorporating the invention for holding work;

FIGURE 2 is a plan view similar to that of FIGURE 1, and showing an adaptation of my invention in the holding of work;

FIGURE 3 is a fragmentary, sectional view on an enlarged scale, taken on the line 3—3 of FIGURE 1;

FIGURE 4 is a perspective view, on an enlarged scale, of one of the work holding and feeding devices of the invention;

FIGURE 5 is a fragmentary sectional view, on an enlarged scale, taken on the line 5—5 of FIGURE 4; and FIGURE 6 is a perspective view of an element of the work holding device of FIGURE 4.

Referring to the drawing, I have shown in FIGURES 1 and 2 a table 1 slotted at 2 to allow passage therethrough of a rotary saw blade 3 which is power operated. The table 1 on the top thereof is provided with grooves or guideways 4 and 5 spaced equidistantly from the saw of the saw blade. Both grooves are open ended, as shown, blade on opposite sides thereof and parallelling the plane. The construction just described is common in the practice. The grooves 4 and 5 usually receive some type of bar which is movable within the grooves and which bars generally have secured thereto a miter gauge of some type, not shown. The miter gauge is, of course, for the purpose of holding work at an angle as the work and the bar or bars are moved toward the cutter teeth of the saw blade. Adjusting the miter gauge is, of course, required whereas I provide what I term a work holding and feeding device which secures the work in position to allow cutting thereof at a desired angle by the saw blade. The work holding and feeding device is designated as an entirety as 6 and such a device may be provided in each groove 4 and 5, each device being freely slidable within a groove. The device 6, shown in FIGURE 4, comprises an elongated substantially rectangular sectioned bar provided with spaced apart blind holes 7; i.e., holes that extend from the top surface 8 of the bar and terminate inwardly from the bottom or base surface 9 of the bar, as shown at 10. The holes are placed intermediate the width of the bar and equidistantly spaced the length of the bar as shown in FIGURE 4. Fitted within each hole 7 is a cylindrical stud 11, the top surface of which is provided with a central projecting pin 12. The periphery of the stud is knurled as shown at 13, for the purpose of tightly holding the stud within a hole 7. The pin 12 is an impaling means for any work applied against a bar or bars. The pin 12 is preferably heat treated and is of a sufficient axial height to penetrate work a sufficient amount to assure that the work is held firmly in position while overlying a bar.

The operation, uses, and advantages of my invention are as follows.

I may provide one or two bars, as depicted in FIGURES 1 and 2, for reception in the grooves 4 and 5. I assume first that two of said bars are used as depicted in FIGURE 1 and that the work 14 is of a material such as wood, which allows penetration of the pins, is placed at the desired angle at which it is to be cut by the saw blade 2. To accomplish this, the bars are moved outwardly from one edge of the table so that when the work is applied at the proper angle to the plane of the saw blade, the pins will impale the work at a plurality of points and secure the work in position. When the saw blade is rotated, the work is fed manually towards the saw blade, the bars moving within the grooves 4 and 5 to feed the work into saw blade engagement. Only slight pressure on the work is required by the operator in the feeding thereof against the saw blade teeth. In FIGURE 2 the work 15 utilizes a single bar, the work being impaled upon two spaced pins to hold the work at an angularity to the plane of the rotary saw 2. It will be seen that in the operation of FIGURE 2 that small articles may be readily secured by a single bar and still obtain accurate cut. By the arrangement shown, the angle of cut may vary between 1° and 180°.

The top of each stud 11 is preferably flush with the top surface of the work holding bar, as shown in FIGURES 3 and 4. In actual practice, it has been found that the impaling of the wood surface does not damage the wood materially as the wood surface is easily finished. Further, the work, particularly if it is wood, is engaged by more than one of the pins 12, as shown in FIGURE 1 when two bars are utilized so that the work is held against any slippage, and, accordingly, hardness of wood grain has no effect on the operation of my device.

I claim:

1. In combination: a table for a rotary power saw, the table provided with a pair of guide ways extending the width of the table and spaced from and on opposite sides of the rotary power saw and parallel therewith; a work holding and feeding bar for movement in each guide way and outwardly beyond the table width, each bar having a depth equal to the depth of a guide way whereby the surface of the table top and the bars are in flush relationship, each bar provided at intervals throughout its length with blind bores, a cylindrical stud fitted within each bore and having its top surface flush with the top surface of the bar and a pointed pin centrally extending from each stud.

2. The device of claim 1, and means for each stud to provide tight engagement of the stud within a bore.

References Cited by the Examiner
UNITED STATES PATENTS

| | | | |
|---|---|---|---|
| 2,372,779 | 4/45 | Herman et al. | 269—53 |
| 2,373,968 | 4/45 | Lang | 269—53 |
| 2,680,277 | 6/54 | Dodson et al. | 269—5 |
| 2,894,543 | 7/59 | Ivy | 143—169 X |
| 2,922,554 | 1/60 | Zauncosky et al. | 269—55 X |

ROBERT C. RIORDON, *Primary Examiner.*

FRANK SUSKO, *Examiner.*